United States Patent [19]

Bolton

[11] Patent Number: 4,599,670

[45] Date of Patent: Jul. 8, 1986

[54] CONTROL OF RELATIVE HUMIDITY IN MACHINE ENCLOSURES

[75] Inventor: Ivor W. Bolton, Winchester, United Kingdom

[73] Assignee: International Business Machines Corporation, Armonk, N.Y.

[21] Appl. No.: 126,741

[22] Filed: Mar. 3, 1980

[30] Foreign Application Priority Data

Jun. 29, 1979 [GB] United Kingdom ............... 7922792

[51] Int. Cl.$^4$ .............................................. G11B 0/00
[52] U.S. Cl. .................................................. 360/137
[58] Field of Search ............... 360/97, 137; 236/44 A

[56] References Cited

U.S. PATENT DOCUMENTS

| 2,325,061 | 7/1943 | Kaufman | 236/44 A |
| 3,740,735 | 6/1973 | Gabor | 360/97 |
| 4,018,579 | 4/1977 | Hofmann | 236/44 A |
| 4,054,931 | 10/1977 | Bolton | 360/97 |

FOREIGN PATENT DOCUMENTS

| 0038909 | 3/1977 | Japan | 360/97 |
| 1072528 | 6/1967 | United Kingdom . | |

OTHER PUBLICATIONS

IBM-TDB "Disk File Humidity Control System" R. L. Martin and D. D. Palmer, vol. 16, No. 8, Jan. 1974, p. 2566.

Primary Examiner—Harold I. Pitts
Attorney, Agent, or Firm—Walter J. Madden

[57] ABSTRACT

Relative humidity within a machine enclosure is controlled by means of a desiccant and a circulatory breather flow through the enclosure walls. The desiccant absorbs moisture during power off periods to keep the relative humidity down. During power on periods the enclosure temperature rises, which drives off the absorbed moisture from the desiccant. Operation of the machine also creates a pressure differential between two breather orifices in the enclosure walls so that there is a circulatory exchange of air between the enclosure and atmosphere. If the desiccant has absorbed a significant amount of moisture during power off periods, the moisture concentration within the enclosure will exceed that outside and there will be a net expulsion of moisture to partially recharge the desiccant.

2 Claims, 9 Drawing Figures

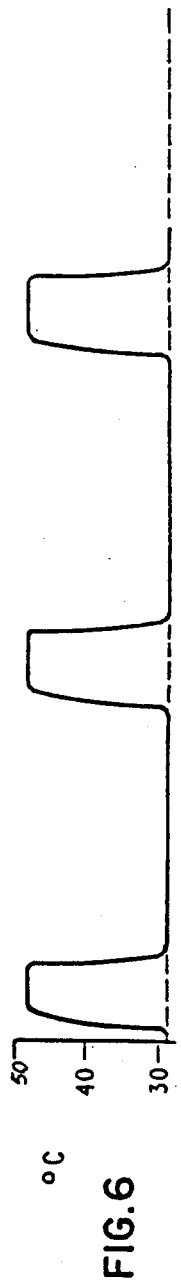
FIG.6 °C
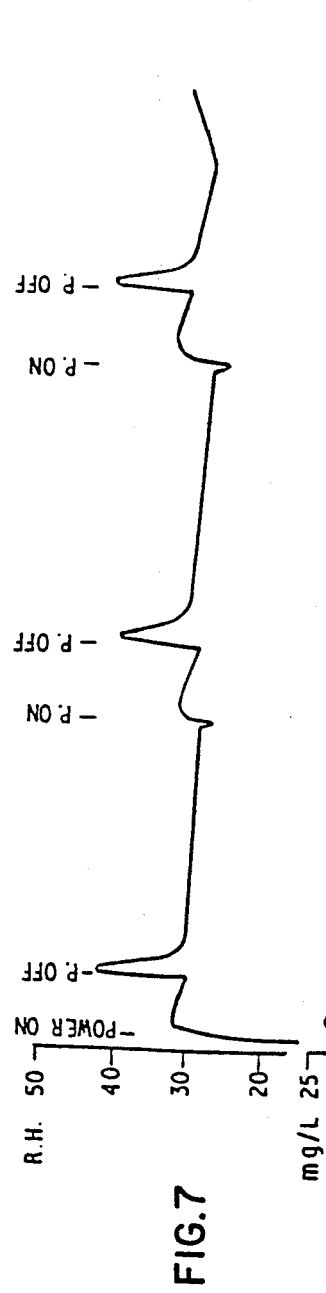
FIG.7 R.H.
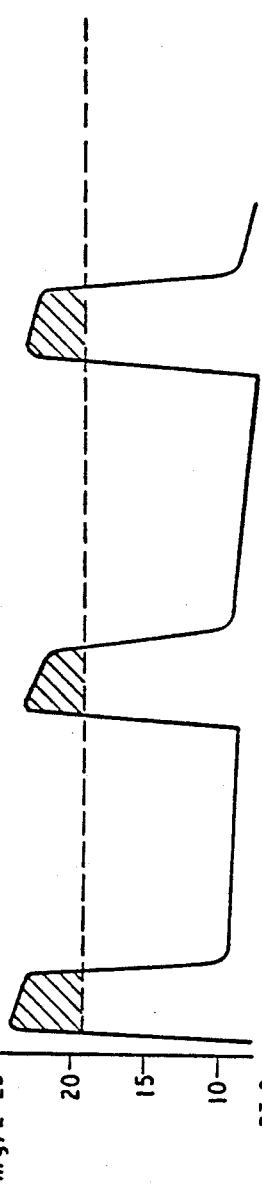
FIG.8 mg/L
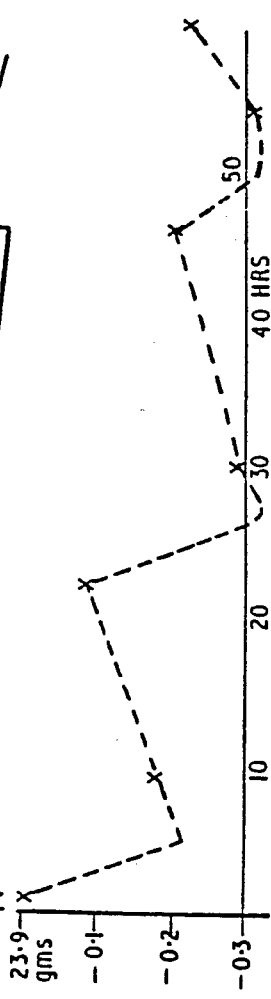
FIG.9

CONTROL OF RELATIVE HUMIDITY IN MACHINE ENCLOSURES

BACKGROUND OF THE INVENTION

1. Technical Field

This invention relates to the control of relative humidity in substantially sealed machine enclosures.

2. Background Art

One type of machine to which the present invention may be applied is a magnetic disk file in which the disks are contained in a substantially sealed enclosure. Such a disk file is described in U.S. Pat. No. 4,054,931, assigned to the same assignee as the present application, which relates to a gas filtering arrangement for the file.

In the file described in that patent, the disk enclosure wall includes a bearing for supporting a drive shaft passing through the wall. A number of disks and a fan are mounted on the shaft within the enclosure. When the shaft rotates, the fan pumps air through a main filter, also within the enclosure, to clean the air therein. A breather filter, within the enclosure, is connected to the exterior by a breather aperture. The breather arrangement acts to equalize pressure as far as possible between the interior and exterior of the enclosure to reduce stresses caused by expansion and contraction of the air within the enclosure.

When the drive shaft rotates, a pressure distribution is created by rotation of the fan and disks such that a positive pressure is maintained adjacent to the bearing. This prevents air from entering the disk enclosure through the bearing and bringing with it contaminants such as grease droplets.

In a disk file such as that described above and also in other substantially sealed machine enclosures, high levels of humidity are often undesirable because of problems of condensation or corrosion of the enclosed components. In the case of disk files, the use of thin film deposition techniques to fabricate read/write heads and to provide the magnetic coating on the disks has been proposed. Such thin film head and disk components are more susceptible to corrosion than are the machined ferrite heads and particulate oxide coated disks which they replace.

Whenever a machine enclosure has a breather aperture or is deliberately or otherwise imperfectly sealed, there will be a small leakage of the surrounding atmosphere into the enclosure which will result in internal moisture concentrations equal to those of the surrounding atmosphere. If the running temperature of the machine is significantly above ambient temperatures the relative humidity within the enclosure may still be relatively low when the machine is in use. However, during power off periods the internal relative humidity is as high as the external humidity.

The prior art shows many examples of the use of desiccant materials to control humidity within various types of enclosures. In order to provide humidity control for the lifetime of a machine or enclosure, either a large quantity of desiccant is required or means must be provided to replace or recharge a smaller quantity of desiccant.

U.K. Pat. No. 1,072,528 discloses an air drying arrangement for the air space above the oil in an oil filled transformer. An external breather tube contains a desiccant charge for drying air flowing into the space as the oil contracts during power off. Heated oil from the transformer combined with air expelled through the breather tube by oil expansion after power on, is effective to recharge the desiccant. However, this action relies on a large change of volume of the enclosed space and the desiccant is external to and remote from this space.

DISCLOSURE OF THE INVENTION

A machine, such as a disk file, may be expected to have a useful life of five to ten years, which period will include a significant amount of idle time. To protect the enclosed components from excessive relative humidity during power off periods over the entire lifetime of the machine with a single charge of desiccant could require an unacceptably large quantity. Regular replacement of a smaller amount of desiccant would increase the amount of servicing required and would probably require the desiccant to be located on the periphery of the enclosure for ease of access.

Accordingly, the present invention provides a machine comprising a substantially sealed enclosure, operation of the machine creating a rise in temperature within the enclosure, the machine further comprising a rechargeable desiccant within the enclosure for absorbing water vapor therein, two breather orifices communicating between the interior and exterior of the enclosure, and means for creating a pressure differential between the breather orifices during machine operation to produce a circulatory exchange of air between the enclosure and its surrounding atmosphere through the breather orifices.

In such machines, a relatively small quantity of desiccant may be located within the enclosure. The relatively very small air flow in and out of the file due to expansion and contraction alone is supplemented by the provision of a second breather orifice, and means for creating a pressure differential, so that a circulatory exchange of air takes place between the interior and exterior of the enclosure. If the desiccant has absorbed a significant amount of moisture during long power off periods, this moisture is driven off as the temperature of the machine enclosure rises. The result is that the concentration of moisture within the file becomes greater than that outside and the circulatory exchange of air through the breathers will result in a net loss of moisture from the file. It should be noted that this moisture loss can occur nothwithstanding that the relative humidity may be lower within the enclosure at machine running temperatures than it is outside the enclosure. This is because relative humidity is a function of temperature.

It is a preferred feature of the invention that the machine includes a shallow tray for containing the desiccant and a retaining cover for retaining the desiccant therein through which cover air may pass freely. The preferred desiccant is silica gel.

Where the machine contains rotatable mechanical components within the enclosure, it is a preferred feature of the invention that these components constitute the means for creating a pressure differential between the breather orifices. Creation of this differential may be assisted by a fan.

In one preferred form of the invention, the two breather orifices are located at different radial distances from the axis of rotation of the rotatable mechanical components. Where a fan is used, for example, the region near the fan hub is likely to be at low pressure whereas regions near the periphery of the fan blades are at a higher pressure.

It is yet another preferred feature of the invention that a breather filter is associated with at least one and preferably both breather orifices. Such a breather filter can advantageously comprise two chambers both divided laterally by a common filter sheet. In this case the breather filter and desiccant tray are preferably part of a common unit comprising upper and lower halves between which a common filter sheet is retained.

Where the machine is of the type including rotatable mechanical components which include a shaft passing through a wall of the enclosure and supported for rotation by at least one bearing in the enclosure wall, the bearing providing a path for gas leakage between the interior and exterior of the enclosure, then it is a preferred feature of the invention that the leakage path constitutes at least a portion of one of the breather orifices. A gas labyrinth in series with such a gas leakage path can advantageously complete the breather orifice.

BRIEF DESCRIPTION OF THE DRAWINGS

The invention will now be described with reference to a preferred embodiment thereof as illustrated in the accompanying drawings in which:

FIG. 6 shows the variation of temperature of a simulated disk enclosure as the power is switched on and off over a period of time;

FIG. 7 shows the variation of relative humidity within the enclosure over the same period of time;

FIG. 8 shows the variation of the concentration of moisture within the enclosure over the same period of time; and FIG. 9 shows the variation in weight of a quantity of silica gel within the enclosure over the same period of time.

DESCRIPTION OF THE PREFERRED EMBODIMENT

Figure 1:
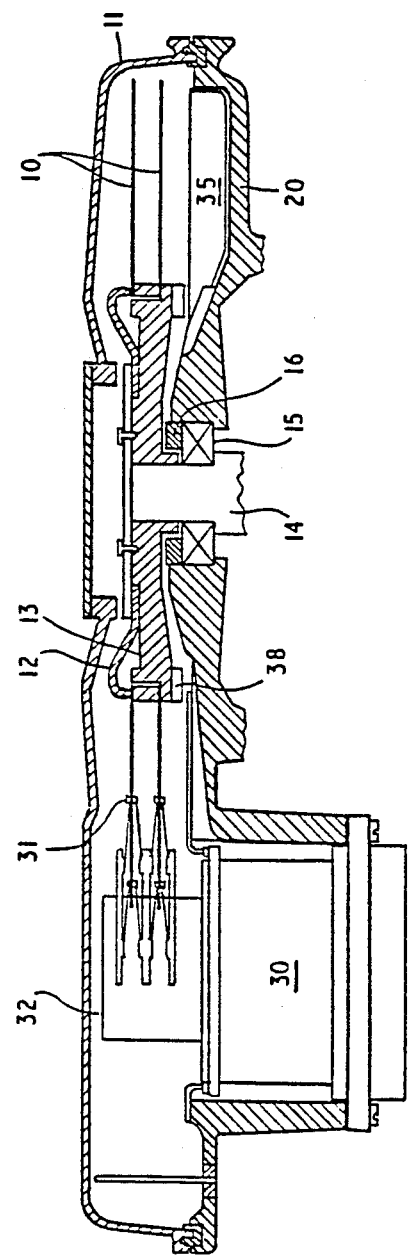
FIG. 1 shows a section through a disk enclosure portion of a disk file which constitutes a machine according to the present invention.

In FIG. 1 there is shown a portion of a magnetic disk file of the type in which disks 10 are enclosed in an enclosure generally indicated at 11. The disks are clamped by clamps 12 to a hub 13 which is keyed to spindle 14. The spindle 14 is partially supported by bearing 15 for rotation by an external drive (not shown) which supports the other end of the spindle. The main bearing 15 is located in a base casting 20 through which the spindle 14 passes for connection to the external drive. Bearing 15 is of the sealed type. Ring 16 is provided to trap particles of grease which are released by the bearing. Also, part of the file is an actuator 30 (shown in outline) for positioning read/write heads 31 mounted on a movable head/arm assembly 32 to selected tracks of the file.

Finally, the enclosure contains a filter unit 35, shown in much greater detail in FIGS. 2 to 5. The filter unit can communicate with the external atmosphere via breather orifices through the casting 20 (36 and 37 FIG. 4). To assist the action of the filter, the hub 13 is formed with fan blades 38 which, together with the rotation of the disks 10, force air through the filter unit in a manner to be described.

Figure 2:
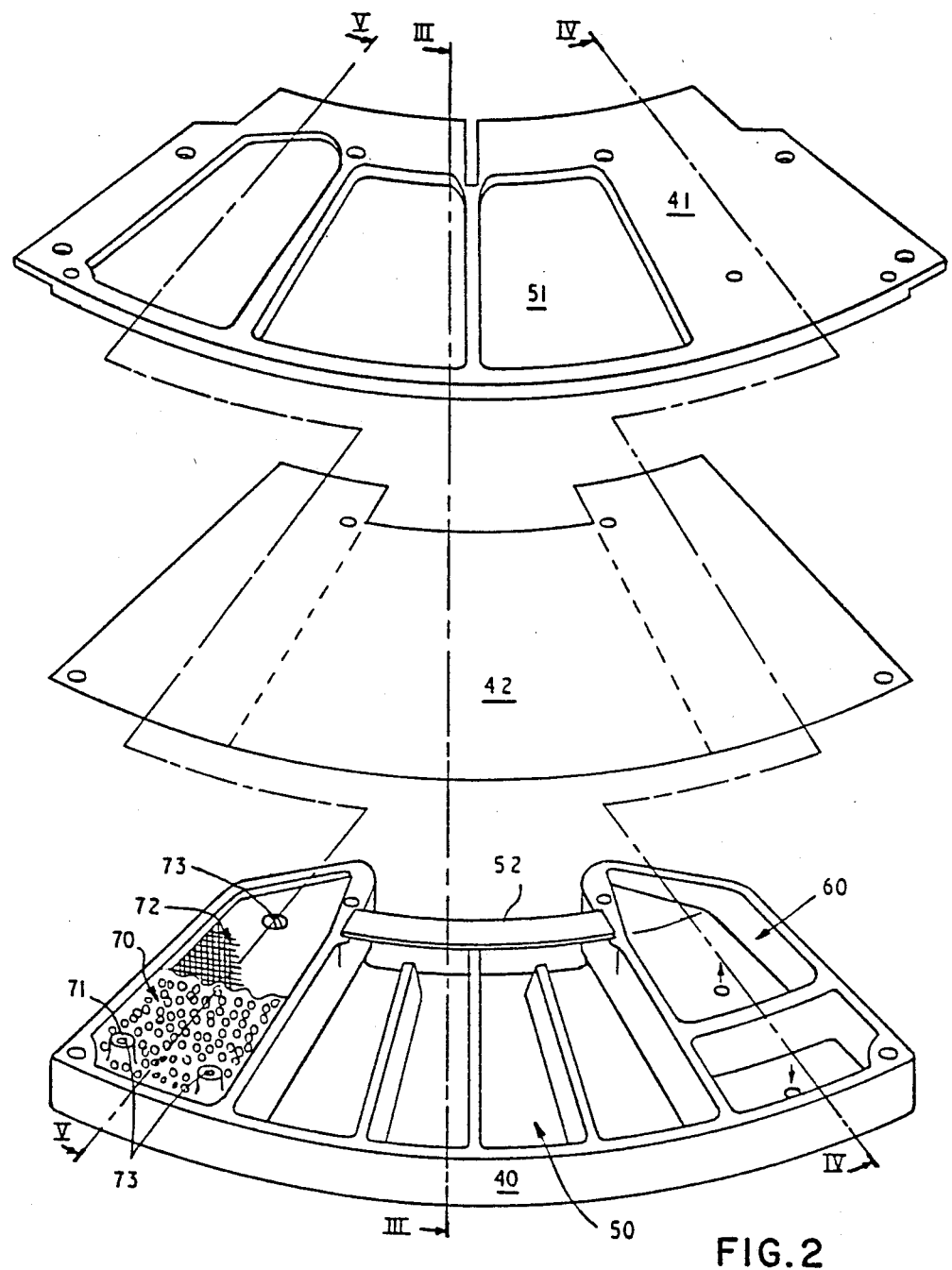
FIG. 2 shows an exploded view of a filter unit located in the disk enclosure of FIG. 1.
Figure 3:
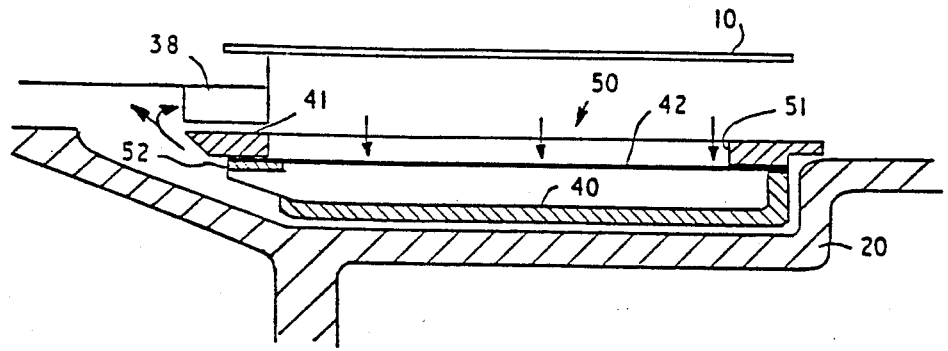
FIG. 3 shows a section through the filter unit of FIG. 2 taken on the line III—III.
Figure 4:
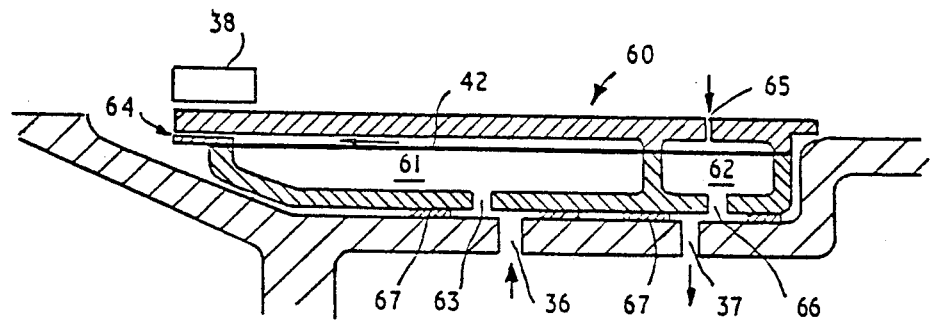
FIG. 4 shows a section through the filter unit of FIG. 2 taken on the line IV—IV.
Figure 5:
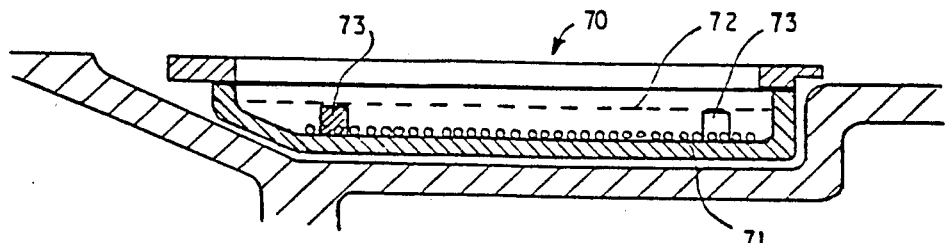
FIG. 5 shows a section through the filter unit of FIG. 2 taken on the line V—V.

Referring now to FIG. 2, the filter unit 35 is shown in exploded and partly broken away view. Sections through the assembled filter unit on the lines III—III, IV—IV and V—V are shown in FIGS. 3, 4 and 5. The filter unit is in the form of an annular sector and is constructed of a metal base portion 40, a plastics material top portion 41 and a filter paper 42 trapped between the base and top portions.

The filter unit is divided into three functional parts, a main filter 50 (FIG. 3), a breather filter 60 (FIG. 4) and a desiccant bed 70 (FIG. 5).

The action of the main filter is relatively simple and the airflow through it is shown by the arrows in FIG. 3. The rotation of the disks 10 and fan blades 38 drives air down through windows 51 in the main filter top portion, and forces it through the filter paper 42. Radially inwardly of fan blades 38, a low pressure region is created to which the filtered air is drawn via a channel formed by cross bar 52 and an opposed portion of casting 20. The air within disk enclosure 11 is thus repeatedly passed through main filter 50 as the disks rotate, which thus removes any contaminant particles loose in the disk enclosure.

The breather filter 60 (FIG. 4) consists of two chambers 61 and 62 each located over respective breather orifices 36 and 37 in base casting 20. A breather orifice and filter is desirable in a disk enclosure to prevent stress damage caused by expansion and contraction of the air within the enclosure as the enclosure heats up and cools down. The temperature within a disk file enclosure typically rises of the order of 20° C. above the ambient temperature when the file is running.

When the file is heating up or cooling down and the disks are stationary, airflow through breather orifices 36 and 37 will be in the same direction either inwardly or outwardly. However, when the file is running, the rotation of the disks and fan creates a pressure differential within the enclosure such that air flows in through orifice 36 and out through orifice 37.

Airflow into the enclosure through orifice 36 enters chamber 61 of the breather filter through port 63 and, after passing through filter paper 42 leaves via bore 64 which is adjacent the low pressure region within the fan blades 38. Airflow out of the enclosure passes through port 65 and through filter paper 42 into chamber 62 and exits from port 66. It is necessary for the filter paper to extend across both chambers 61 and 62 since, as has been explained, air may pass inwardly through both chambers when the enclosure is cooling down. A gasket 67 spaces the base portion 40 of the filter unit from casting 20 and separates the airflows through orifices 36 and 37.

The net effect of the breather system is that, when the file is running, there is a circulatory exchange of air between the interior and exterior of the file via the breather orifices. The rate of flow is determined primarily by the dimensions of ports 64 and 65 which, being the smallest, offer the highest flow restrictions in the breather flow path. Although the rate of breather flow is very low compared to that through the main filter, it is high compared to that due to expansion and contraction alone and is continuous when the file is running. A typical breather flow is 0.1 liter/minute. The breather flow resistances are in the range 23/225 mm WG/L/minute.

The desiccant bed 70 is shown in FIGS. 2 and 5. It is simply a tray-like container filled with between 25 and 75 gms of silica gel 71. The gel is retained in the tray by a wire mesh 72 supported on posts 73 and is also covered by filter paper 42. There is no forced airflow through the desiccant bed and air reaches it by molecular diffusion.

The purpose of the desiccant is to limit the relative humidity in disk enclosure 11 during power off periods by absorbing moisture which leaks in from the external atmosphere through breather filter 60 or via imperfect enclosure seals. This is necessary in order to prevent corrosion of enclosed components such as heads 31.

After a very long power off period the desiccant may become saturated with water which would render it ineffective. However, a combination of the rise in temperature when the machine is run and the circulatory flow created by the breather arrangement is effective to recharge the desiccant.

The effect is demonstrated by considering FIGS. 6–9 which show the results of experiments to measure the changes in relative humidity and moisture concentration within a simulated disk enclosure in an environmental test chamber over a number of power on/power off cycles. In these experiments, 24 gms of partly saturated silica gel were employed as a desiccant under 28 $cm^2$ filter paper. A breather filter flow of 250 ml per minute was maintained and the main filter flow rate was equivalent to 1 complete air change per minute. The chamber temperature was 29° C. and its relative humidity 65%.

In FIG. 6 the variation of disk enclosure temperature with power on and off is shown. The rise in temperature during power on is 19° C.

FIG. 7 shows how the relative humidity within the enclosure varies whereas FIG. 8 shows how the actual concentration of moisture in the enclosure varies.

When the power is switched on, the simulated disk enclosure begins to heat up. In the absence of a desiccant, this would result in a sharp fall in enclosure relative humidity which is a function of temperature. However, the heating of the enclosure also expels trapped moisture from the desiccant with the result that the relative humidity actually rises slightly. Because of this expulsion of moisture, the actual concentration of moisture in the file rises steeply when the power goes on and exceeds the moisture concentration in the chamber outside the enclosure. It should be noted that this is possible even though the enclosure relative humidity remains below the chamber relative humidity, because relative humidity is a function of temperature, which is 19° C. lower outside the enclosure.

Because of the circulatory airflow through the breather filter, air is exchanged between the enclosure and its surroundings with the result that the moisture concentration within the enclosure falls steadily during power on. In other words there is a net loss of moisture from the file during power on and the desiccant is partially recharged as shown by its variation in weight in FIG. 9.

When the power goes off again the enclosure relative humidity momentarily rises steeply, as the temperature of the enclosure falls, but falls again as the moisture is reabsorbed by the desiccant. Subsequent power on periods further reduce the moisture in the desiccant and the enclosure relative humidity in power off periods is slightly lower each cycle. Thus a breather flow can be selected for a worst case power on/power off cycle such that the relative humidity during power off is kept low and the desiccant is periodically partially recharged.

Although two breather orifices are necessary for the present invention to work, it is not necessary that these should both be part of a breather filter as shown in FIGS. 2-5. In U.S. Pat. No. 4,054,931, discussed above, a circulatory breather flow may be achieved by way of the single breather filter orifice shown and the orifice formed by the lower spindle bearing and labyrinth. By selection of flow restrictions, this flow could be made effective to maintain low relative humidity and to recharge a desiccant in a similar manner to the preferred embodiment.

Furthermore, although described in terms of a disk file, the invention is applicable to any substantially sealed machine enclosure where the same problem exists. A heater may be provided to produce the necessary temperature rise during power on and a fan may be provided to establish or assist breather flow if these are not consequent upon the normal running of the machine.

What we claim is:

1. A machine having a substantially sealed enclosure, operation of the machine creating a rise in temperature within the enclosure, the machine comprising:
   a rechargeable desiccant within the enclosure for absorbing water vapor therein when said machine is not operating,
   a shallow tray for containing the desiccant,
   a retaining cover through which air may pass freely for retaining the desiccant in the tray,
   two breather orifices communicating between the interior and exterior of the enclosure,
   a breather filter associated with both the breather orifices which lie on substantially the same radial line, through which filter air must pass when entering the enclosure via the breather orifices, the filter comprising two chambers both divided by a common filter sheet, each chamber being associated with a respective breather orifice, and
   rotating mechanical elements in said enclosure for creating a pressure differential between the breather orifices during machine operation to produce a circulatory exchange of air between the enclosure and its surrounding atmosphere through the breather orifices, said exchange of air driving off moisture from said desiccant after the start of operation of said machine as a result of said temperature rise.

2. A machine as claimed in claim 1, in which the breather filter and desiccant tray are part of a common unit comprising upper and lower halves between which a common filter sheet is retained.

* * * * *